US005771379A

United States Patent [19]

Gore, Jr.

[11] Patent Number: 5,771,379
[45] Date of Patent: Jun. 23, 1998

[54] FILE SYSTEM AND METHOD FOR FILE SYSTEM OBJECT CUSTOMIZATION WHICH AUTOMATICALLY INVOKES PROCEDURES IN RESPONSE TO ACCESSING AN INODE

[75] Inventor: Robert C. Gore, Jr., Pflugerville, Tex.

[73] Assignee: International Business Machines Corporation, Armonk, N.Y.

[21] Appl. No.: 548,354

[22] Filed: Nov. 1, 1995

[51] Int. Cl.$^6$ .................................................. G06F 17/30
[52] U.S. Cl. ........................ 395/612; 395/613; 395/611; 395/610; 369/58
[58] Field of Search ................................. 395/700, 600, 395/160, 650, 349, 348, 340, 183.03, 611, 610, 612, 614; 364/280; 369/58

[56] References Cited

U.S. PATENT DOCUMENTS

| | | | |
|---|---|---|---|
| 4,604,686 | 8/1986 | Reiter et al. | 395/500 |
| 4,761,737 | 8/1988 | Duvall et al. | 364/300 |
| 4,825,354 | 4/1989 | Agrawal et al. | 395/610 |
| 5,001,628 | 3/1991 | Jonson et al. | 395/610 |
| 5,079,695 | 1/1992 | Dysart et al. | 395/700 |
| 5,175,852 | 12/1992 | Johnson et al. | 395/600 |
| 5,185,885 | 2/1993 | Dysart et al. | 395/600 |
| 5,210,876 | 5/1993 | Uchida | 395/705 |
| 5,297,253 | 3/1994 | Meisel | 395/160 |
| 5,301,321 | 4/1994 | Bell et al. | 395/650 |
| 5,303,392 | 4/1994 | Carney et al. | 395/705 |
| 5,305,434 | 4/1994 | Ballard et al. | 395/357 |
| 5,307,498 | 4/1994 | Eisen et al. | 395/704 |
| 5,355,497 | 10/1994 | Cohen-Levy | 395/616 |
| 5,359,701 | 10/1994 | Fukui et al. | 395/62 |
| 5,361,349 | 11/1994 | Sugita et al. | 395/600 |
| 5,371,885 | 12/1994 | Letwin | 395/600 |
| 5,412,808 | 5/1995 | Bauer | 395/600 |
| 5,454,103 | 9/1995 | Coverston et al. | 395/600 |
| 5,463,772 | 10/1995 | Thompson et al. | 395/612 |
| 5,475,668 | 12/1995 | Azumatani et al. | 369/58 |
| 5,559,958 | 9/1996 | Farrand et al. | 395/183.03 |
| 5,602,997 | 2/1997 | Carpenter et al. | 395/349 |

OTHER PUBLICATIONS

Christensen et al., "File Interface for Migrating Application . . . ", IBM Technical Disclosure Bulletin, vol. 35, No. 1A, Jun. 1992, pp. 182–183.

Primary Examiner—Thomas G. Black
Assistant Examiner—Charles L. Rones
Attorney, Agent, or Firm—Richard A. Henkler; Brian F. Russell; Andrew J. Dillon

[57] ABSTRACT

An improved file system, file system object and method for customizing a file system object within a data processing system are disclosed. The data processing system executes an operating system and includes a storage media having contents organized according to a file system. According to the present invention, a file system object is stored within the storage media which comprises object data, a procedure, and a node that contains a number of attributes of the file system object. The attributes of the file system object contained within the node include an object data location indicator which indicates one or more locations of the object data within the storage media and a procedure location indicator which indicates one or more locations of portions of the procedure within the storage media. In response to the operating system of the data processing system reading the node in order to access the object data of the file system object, execution of the procedure is automatically invoked, wherein functionality of the file system object is customized.

19 Claims, 6 Drawing Sheets

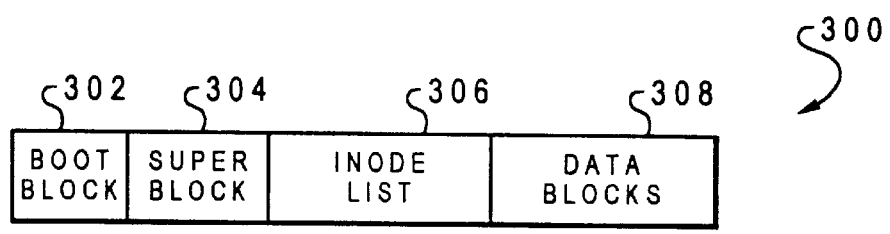
Fig. 7
Prior Art
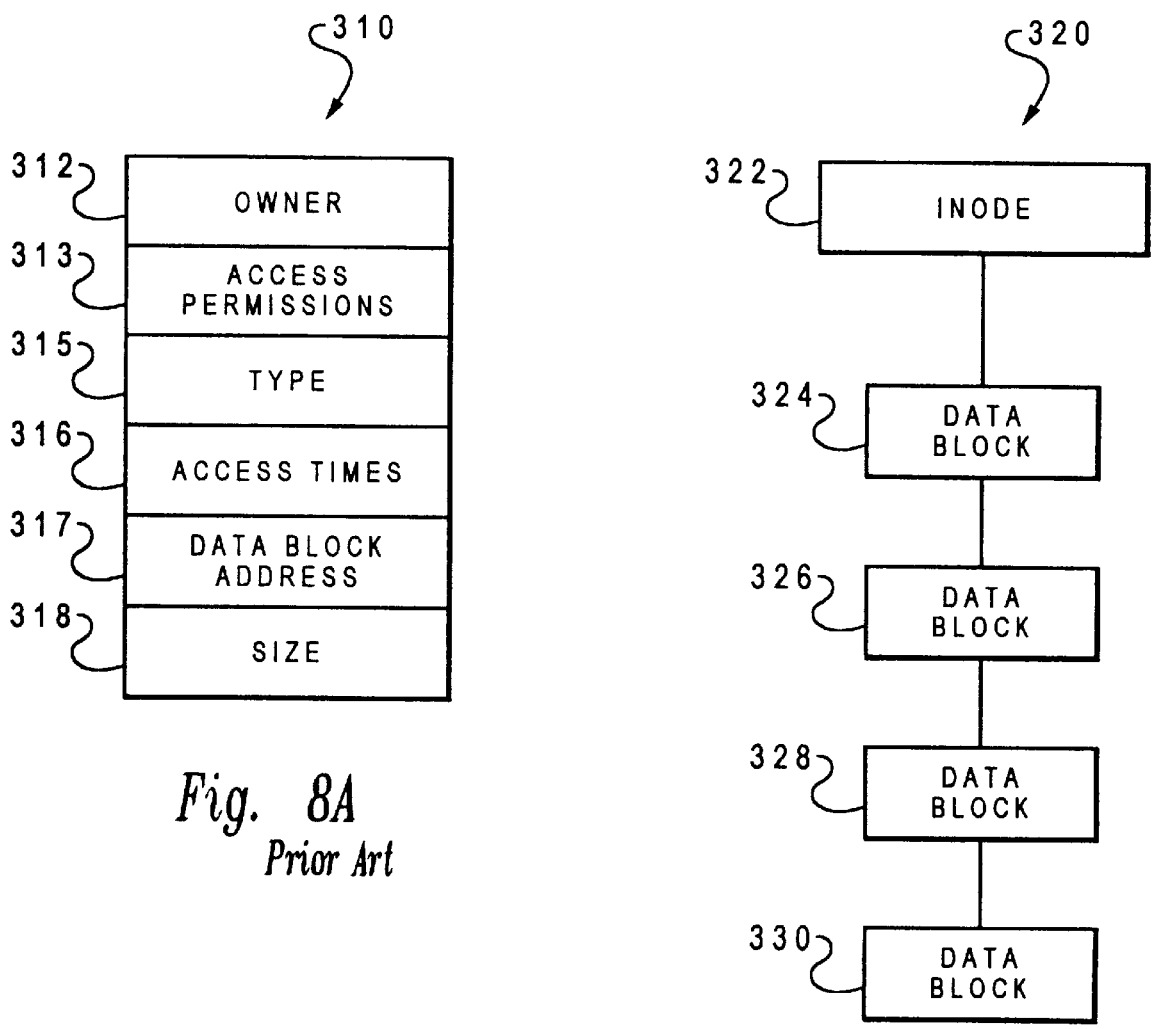
Fig. 8A
Prior Art
Fig. 8B
Prior Art ical Field

FILE SYSTEM AND METHOD FOR FILE SYSTEM OBJECT CUSTOMIZATION WHICH AUTOMATICALLY INVOKES PROCEDURES IN RESPONSE TO ACCESSING AN INODE

BACKGROUND OF THE INVENTION

1. Technical Field

The present invention relates in general to a method and system for data processing and, in particular, to a file system and method within a data processing system which enable the customization of file system objects. Still more particularly, the present invention relates to a file system and method within a data processing system which support file system object customization through the attachment of a procedure to a file system object.

2. Description of the Related Art

Within data processing systems that utilize conventional file systems like the AIX Journaled File System (JFS) and High Performance File System (HPFS), collections of information, including programs and application data sets, are stored within nonvolatile storage (e.g., a hard disk drive) as files. Files, in turn, are grouped into directories or folders which can be hierarchically arranged by a user to ensure a logical and intuitive organization of the files and directories/folders. Although many conventional file systems are not object-oriented in nature, files, directories/folders, and indeed other file system entities, such as logical network drives, can be viewed as objects. As utilized hereinafter, a file system object refers to any file system entity (e.g., files or directory objects) viewed as an object, regardless of whether or not the file system itself interacts with the file system entity in an object-oriented fashion.

With reference now to FIG. 7, there is illustrated a pictorial representation of the structure of a conventional file system within a nonvolatile storage device of a data processing system. As depicted, file system 300 includes boot block 302, super block 304, inodes 306, and data blocks 308. Boot block 302 typically occupies the first sector of the nonvolatile storage device and contains bootstrap (operating system loader) software utilized to boot a particular operating system within the data processing system. Super block 304 stores information describing the state of file system 300, including the current file system size, the total file system capacity, and the location of free space within file system 300. Inode (index node) list 306 contains one or more inodes, which each comprise an internal file system representation of a file system object. One of the inodes within inode list 306, designated as the root inode, provides a directory access path for the file system (e.g., C:\). Although inode is common parlance within literature discussing file systems utilized by the UNIX® operating system, as employed herein, inode refers generically to a file system's internal representation of a file system object. Finally, file system 300 includes data blocks 308, which are simply uniform sized groupings of data that are each associated with one of the inodes within inode list 306.

Referring now to FIG. 8A, there is depicted a diagram of the structure of an inode of a conventional file system object. Inode 310 includes an owner field 312 that specifies which users have access rights to the file system object. The access rights of the various classes of users are defined within access permissions field 313. Possible access permissions associated with a file include read, write, and execute. If the file system object represented by inode 310 is a directory or folder, access permissions field 313 would specify, for example, which classes of users could search the contents of the directory or folder for a file. As will be understood by those skilled in the art, access permission to a file system object is typically binary, that is, a user is either granted or denied access to the file system object with no possibility of partial access. Inode 310 further includes type field 315 and access times field 316, which indicate the type of the file system object (e.g., a file type—data or application) and the times of creation, last modification, and last access, respectively. Finally, inode 310 contains data block address field 317 and size field 318, which specify the disk addresses of the data blocks of the file system object and the total size of the file system object in bytes. Although each file system object has only a single inode 310, depending upon the flexibility of the file system, the file system object may be referenced by multiple names (e.g., links or symbolic links).

With reference now to FIG. 8B, there is illustrated a conceptual diagram of a conventional file system object stored within the nonvolatile storage of a data processing system. As depicted, file system object 320 comprises an inode 322 and one or more data blocks 324–330. In response to an access of file system object 320, the operating system of the data processing system reads inode 322 and streams data blocks 324–330 into the data processing system by referencing data block address field 317 within inode 322. For example, if file system object 320 is a directory, upon access of inode 322, data blocks 324–330, which specify which files are contained within the directory, are streamed into the data processing system and displayed to a user. Further details of file system structure may be found in Bach, Maurice J., *The Design of the UNIX® Operating System,* Prentice-Hall, 1986.

Although the conventional file system described above provides an orderly method for organizing and accessing information stored within nonvolatile storage, the conventional file system allows only limited flexibility in that access to each file system object is generally dictated by the operating system or the application program utilized to create the file system object. However, limited customization of a conventional file system can be implemented utilizing an Access Control List (ACL), which limits access to designated file system objects to selected users. Because ACLs are limited to access permission extensions stored within a list resident within the file system, ACLs do not enable customization of a file system object itself or the invocation of a program in response to a selected file system access. Thus, if customization of a file system object itself is desired, the user must typically purchase proprietary software from the operating system or application program vendor which provides the desired file system extensions. Alternatively, the user can adopt an unconventional file system that enables the user to implement the desired functionality within a file system object. However, because other users can be unwilling to change file systems, this solution may also be impractical in a multi-user data processing system.

Consequently, it would be desirable to provide an improved file system which supports user-customization of file system objects within a conventional file system. In particular, it would be desirable to provide a method for attaching user-created procedures to selected file system objects to increase file system object functionality, while preserving conventional file system organization.

SUMMARY OF THE INVENTION

It is therefore one object of the present invention to provide an improved method and system for data processing.

It is another object of the present invention to provide an improved file system and method within a data processing system which enable customization of file system objects.

It is yet another object of the present invention to provide an improved file system and method within a data processing system which support the customization of a file system object through the attachment of a procedure to the file system object.

The foregoing objects are achieved as is now described. An improved file system, file system object and method for customizing a file system object within a data processing system are disclosed. The data processing system executes an operating system and includes a storage media having contents organized according to a file system. According to the present invention, a file system object is stored within the storage media which comprises object data, a procedure, and a node that contains a number of attributes of the file system object. The attributes of the file system object contained within the node include an object data location indicator which indicates one or more locations of the object data within the storage media and a procedure location indicator which indicates one or more locations of portions of the procedure within the storage media. In response to the operating system of the data processing system reading the node in order to access the object data of the file system object, execution of the procedure is automatically invoked, wherein functionality of the file system object is customized.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 7 illustrates the structure of a conventional file system within the nonvolatile storage of a data processing system;

FIG. 8A depicts a diagram of a conventional inode of a file system object; and

FIG. 8B illustrates a pictorial representation of a conventional file system object.

DETAILED DESCRIPTION OF PREFERRED EMBODIMENT

Figure 1:
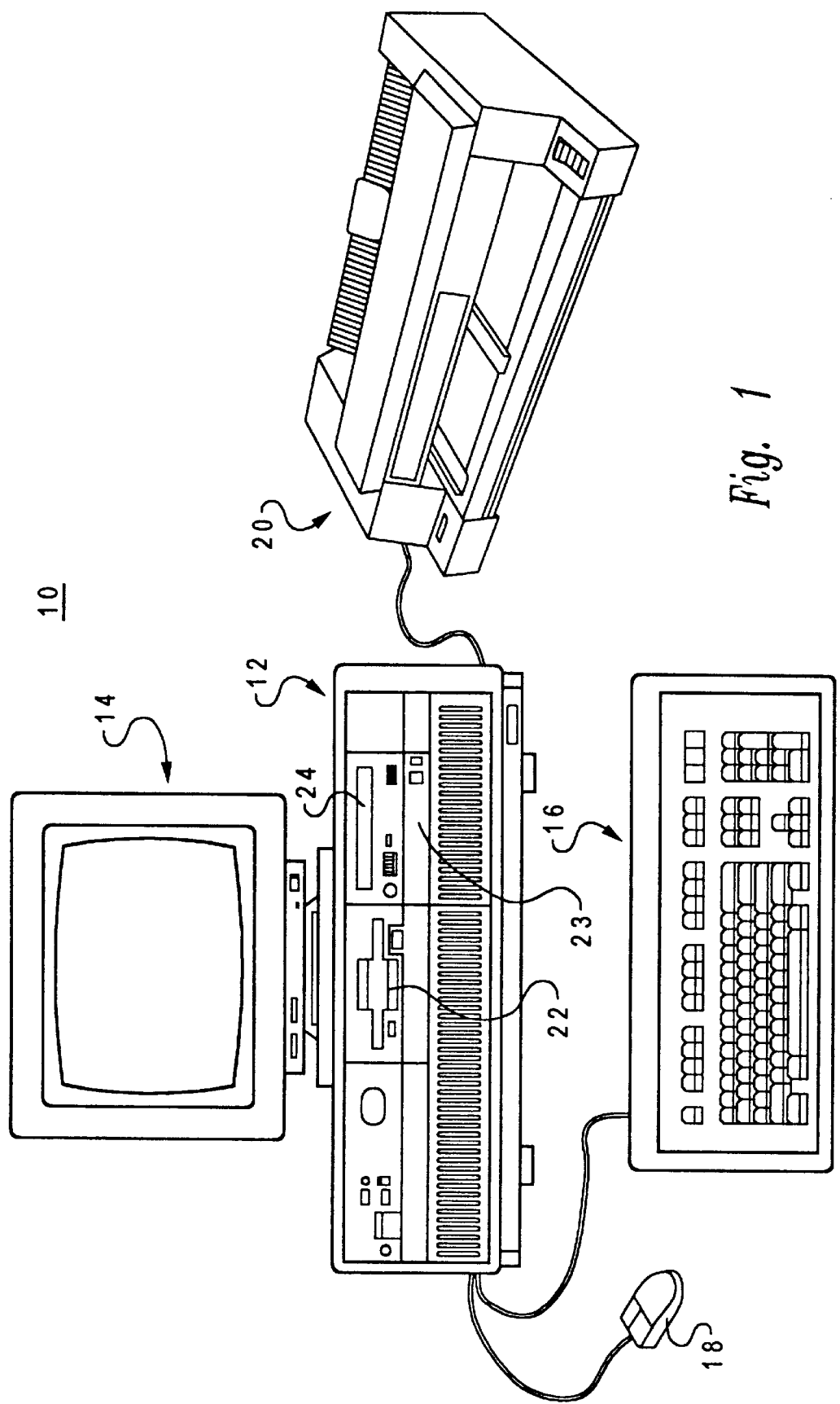
FIG. 1 illustrates a pictorial representation of a data processing system with which the method and file system of the present invention can be advantageously utilized.

With reference now to the figures and in particular with reference to FIG. 1, there is illustrated a preferred embodiment of a data processing system which may be utilized to implement the method of the present invention. As illustrated, data processing system 10 includes system unit 12, display device 14, keyboard 16, mouse 18, and printer 20. As is well-known in the art, system unit 12 receives data for processing from input devices such as keyboard 16, mouse 18, or local area networking interfaces (not illustrated). Mouse 18 is preferably utilized in conjunction with a graphical user interface (GUI) in which hardware and software system objects, including data processing system components and application programs, are controlled through the selection and manipulation of associated graphical objects displayed within display device 14. Data processing system 10 presents output data to a user via display device 14 and printer 20.

To support storage and retrieval of data, system unit 12 further includes diskette drive 22, hard disk drive 23, and CD-ROM drive 24, which are connected to system unit 12 in a well-known manner. Each of nonvolatile storage devices 22–24 employs at least one file system to organize the information stored therein. In instances in which multiple file systems are utilized within a single one of nonvolatile storage devices 22–24, the storage media within the nonvolatile storage device is partitioned such that the information stored within each partition is organized according to only a single file system. As described in detail below, according to the present invention, file system objects within the file systems utilized by nonvolatile storage devices 22–24 can be customized by a user through the attachment of a procedure to the inodes of the file system objects. Of course, those skilled in the art are aware that other conventional components can also be connected to system unit 12.

Figure 2:
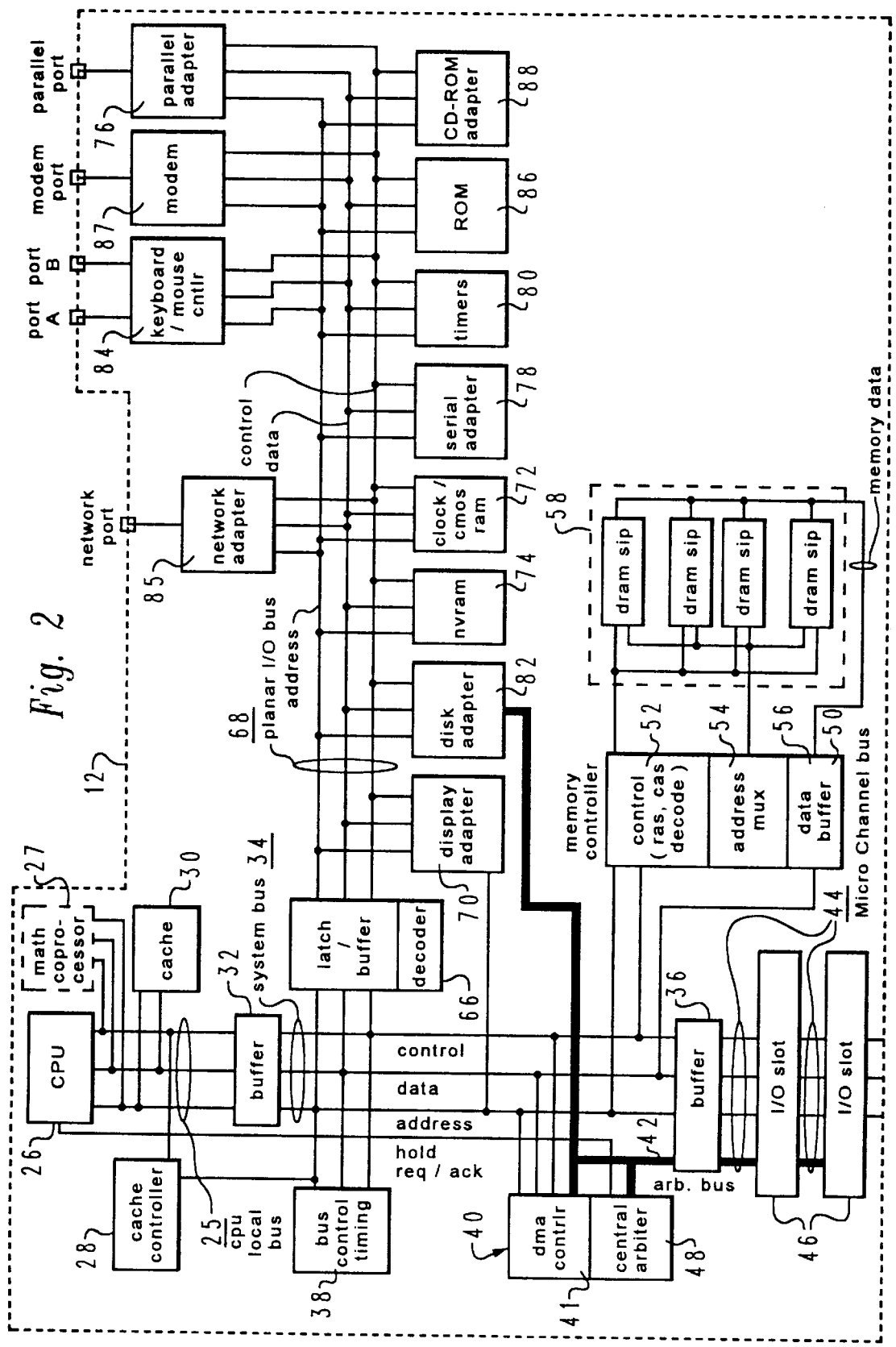
FIG. 2 depicts a block diagram of the system unit of the data processing system illustrated in FIG. 1.

Referring now to FIG. 2, there is depicted a block diagram of the principal components of system unit 12 of data processing system 10. As illustrated, system unit 12 includes a central processing unit (CPU) 26 which executes software instructions. While any appropriate microprocessor can be utilized for CPU 26, CPU 26 is preferably one of the PowerPC™ line of microprocessors available from IBM Microelectronics. Alternatively, CPU 26 can be implemented as one of the 80×86 microprocessors, which are available from a number of vendors.

In addition to CPU 26, an optional math coprocessor 27, cache controller 28, and cache memory 30 are coupled to high-speed CPU local bus 25. Math coprocessor 27 is an optional processor, distinct from CPU 26, that performs numeric calculations with greater efficiency than CPU 26. Math coprocessor 27 is optional since the performance advantage provided by a math coprocessor may be achieved by enhancements to CPU 26, such as the implementation of multiple floating-point execution units. Cache memory 30 comprises a small high-speed memory which stores frequently accessed data and instructions. The operation of cache 30 is controlled by cache controller 28, which maintains a directory of the contents of cache 30 and enforces a selected cache coherency protocol.

CPU local bus 25 is coupled to buffer 32 to provide communication between CPU local bus 25 and system bus 34, which extends between buffer 32 and a further buffer 36. System bus 34 is connected to bus control and timing unit 38 and direct memory access (DMA) unit 40, comprising central arbiter 48 and DMA controller 41. DMA controller 41 supports memory accesses that do not involve CPU 26. Direct memory accesses are typically employed to transfer data directly between RAM 58 and an "intelligent" peripheral device, such as disk adapter 82. DMA requests from multiple peripheral devices are arbitrated by central arbiter 48. As described below, central arbiter 48 also regulates access to devices coupled to expansion bus 44 by control signals transmitted via arbitration control bus 42.

CPU 26 accesses data and instructions from and stores data to volatile random access memory (RAM) 58 through memory controller 50, which comprises memory control unit 50, address multiplexer 54, and data buffer 56. Memory control unit 52 generates read enable and write enable signals to facilitate storage and retrieval of data and includes address translation facilities that map virtual addresses utilized by CPU 26 into physical addresses within RAM 58. As will be appreciated by those skilled in the art, RAM 58 comprises a number of individual volatile memory modules which store segments of operating system and application software while power is supplied to data processing system 10. The software segments are partitioned into one or more virtual memory pages which each contain a uniform number of virtual memory addresses. When the execution of software requires more pages of virtual memory that can be stored within RAM 58, pages that are not currently needed are swapped with the required pages, which are stored within nonvolatile storage devices 22—24.

Memory controller 50 further includes address multiplexer 54, which selects particular addresses within RAM 58, and data buffer 56, which buffers data read from and stored to RAM 58. Memory controller 50 also provides memory protection that isolates system processes and user processes within the virtual address space allocated to each process. Thus, a program running in user mode can access only memory allocated to its virtual address space; the user mode program cannot access memory within another process's virtual address space unless memory sharing between the processes is supported and the program has the appropriate privileges for the access.

Still referring to FIG. 2, buffer 36 provides an interface between system bus 34 and an optional feature bus such as expansion bus 44. Connected to expansion bus 44 are a number of I/O slots 46 for receiving adapter cards which may be further connected to an I/O device or memory. Arbitration control bus 42 couples DMA controller 41 and central arbiter 48 to I/O slots 46 and disk adapter 82. By implementing the a bus arbitration protocol, central arbiter 48 regulates access to expansion bus 44 by adapter cards, controllers, and CPU 26. In addition, central arbiter 48 arbitrates for ownership of expansion bus 44 among the bus masters coupled to expansion bus 44. Bus master support allows multiprocessor configurations of expansion bus 44 to be created by the addition of bus master adapters containing a processor and its support chips.

System bus 34 is coupled to planar I/O bus 68 through buffer 66. Attached to planar I/O bus 68 are a variety of I/O adapters and other peripheral components, including display adapter 70, disk adapter 82, nonvolatile RAM 74, clock 72, serial adapter 78, timers 80, read only memory (ROM) 86, CD-ROM adapter 88, keyboard/mouse controller 84, network adapter 85, modem 87, and parallel adapter 76. Display adapter 70 translates graphics data from CPU 26 into R, G, and B video signals utilized to drive display device 14. Depending upon the operating system and application software running, the visual output may include text, graphics, animation, and multimedia video. Disk adapter 82 controls the storage of data to and the retrieval of data from hard disk drive 24 and diskette drive 22. Disk adapter 82 handles tasks such as positioning the read/write heads within drives 22 and 23 and mediating between drives 22 and 23 and CPU 26. Nonvolatile RAM 74 stores system configuration data that describes the present configuration of data processing system 10. For example, nonvolatile RAM 74 contains information that describes the capacity of hard disk drive 24 or a diskette placed within diskette drive 22, the type of display device 14, the amount of free RAM 58, and the present system configuration. These data remain stored in nonvolatile RAM 74 when power is removed from data processing system 10.

Clock 72 is utilized by application programs executed by CPU 26 for time of day calculations. Serial adapter 78 provides a synchronous or asynchronous serial interface which enables data processing system 10 to communicate with a remote data processing system or peripheral device. Serial communication is governed by a serial communication protocol such as RS-232, RS-422, or the like. Timers 80 comprise multiple interval timers which may be utilized by application or operating system software to time one or more selected events within data processing system 10.

ROM 86 typically stores a basic input/output system (BIOS) which provides user-transparent I/O when CPU 26 is operating under the DOS operating system. BIOS also includes power on self-test (POST) diagnostic routines which perform system set up at power on. For example, POST interrogates hardware, allocates a BIOS data area (BDA), constructs an interrupt vector table to point to interrupt handling routines within ROM 86, and initializes timers 80, clock 72 and other devices within system unit 12. CD-ROM adapter 88 interfaces CD-ROM drive 24 with planar I/O bus 34 to support retrieval of data from an optical disk loaded within CD-ROM drive 24. Keyboard/mouse controller 84 interfaces system unit 12 with keyboard 16 and a pointing device, such as mouse 18. Such pointing devices are typically utilized to control an on-screen element, such as a graphical pointer that specifies the location of the pointer when the user presses a mouse button. Other pointing devices which can be optionally utilized include a graphics tablet, stylus, light pen, joystick, puck, trackball, trackpad, and the pointing device sold by IBM under the trademark "TrackPoint."

Finally, system unit 12 includes network adapter 85, modem 87, and parallel adapter 76, which facilitate communication between data processing system 10 and peripheral devices or other data processing systems. Network adapter 85 is utilized to connect data processing system 10 to an unillustrated local area network (LAN). A LAN provides a user of data processing system 10 with a means of electronically communicating information, including software, with a remote computer or a network logical storage device. Additionally, LAN supports distributed processing, which enables data processing system 10 to share a task with other data processing systems linked to the LAN. Modem 87 supports communication between data processing system 10 and another data processing system over a standard telephone line. For example, modem 87 may be utilized to connect data processing system 10 to an on-line information service, such as the information service provided by Prodigy Services Corporation under the service mark "PRODIGY." Such on-line service providers frequently offer software that can be downloaded into data processing system 10 via modem 87. Furthermore, through modem 87, data processing system 10 can access other sources of software, such as a server, an electronic bulletin board, and the Internet or World Wide Web. Parallel port 76 transmits printer control signals and output data to printer 20 through a parallel port.

Figure 3:
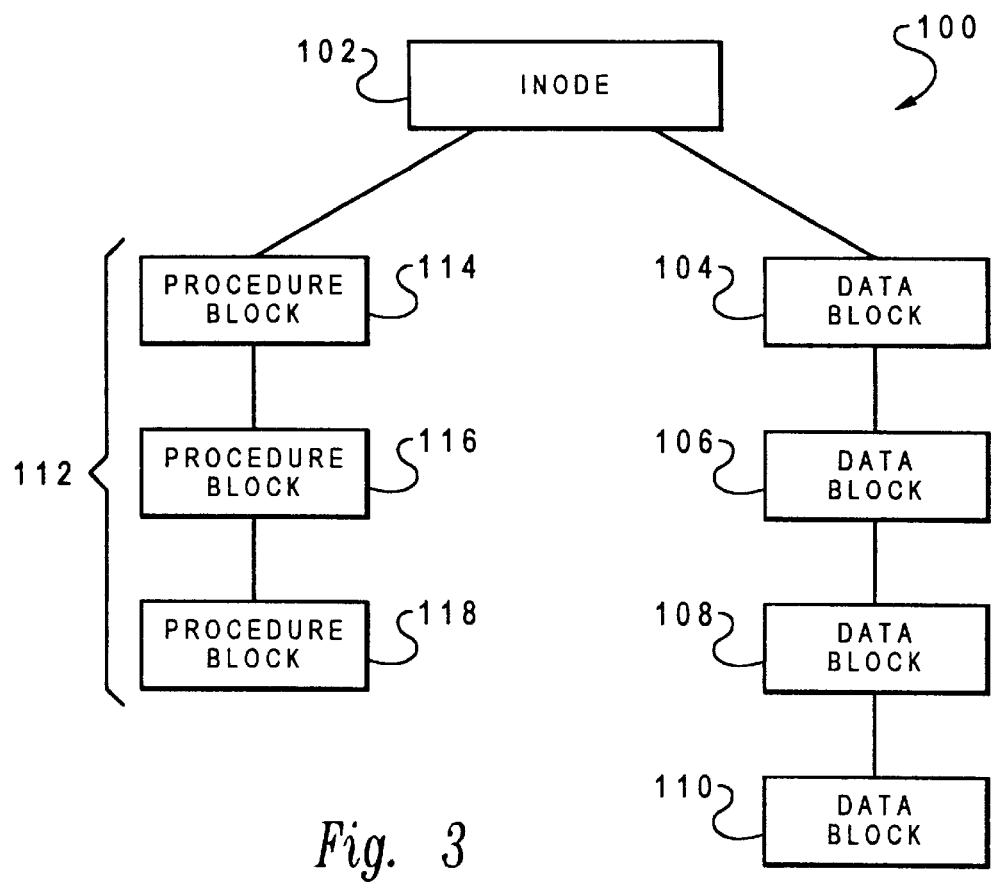
FIG. 3 illustrates a conceptual diagram of a file system object according to a preferred embodiment of the present invention.
Figure 4:
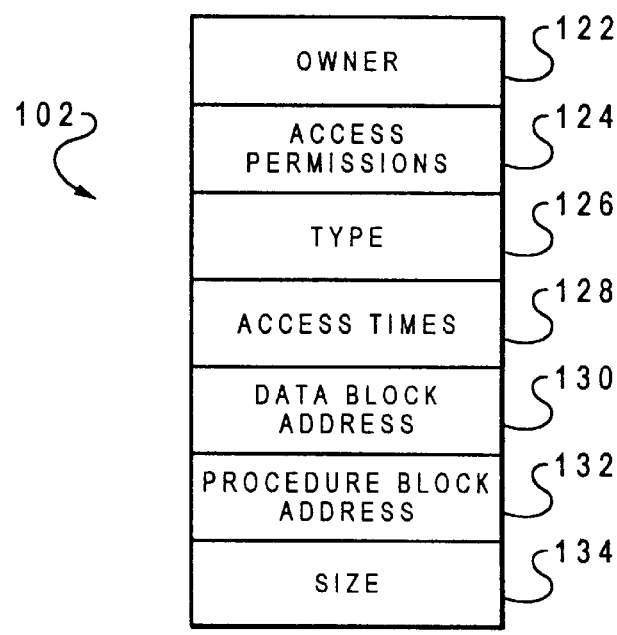
FIG. 4 depicts an inode of a file system object according to a preferred embodiment of the present invention.

With reference now to FIGS. 3 and 4, there is illustrated a pictorial representation of a file system object and the inode of a file system object according to a preferred embodiment of the present invention. Referring first to FIG. 3, file system object 100, which can be a file, directory, or logical device, comprises inode 102, data blocks 104–110, and procedure 112, comprising procedure blocks 114–118. According to the present invention, procedure 112 can be any user-selected set of executable instructions. When a user of data processing system 10 invokes an access to data blocks 104—110, for example, by double-clicking on a file icon displayed within display device 14, the operating system reads inode 102 into data processing system 10 and executes procedure 112. Then, depending upon the instructions comprising procedure 112, procedure 112 may or may not modify and manipulate the file system object data within data blocks 104–110. Thereafter, procedure 112 streams the object data to the operating system reading process.

Referring now to FIG. 4, inode 102 comprises owner field 122, access permissions field 124, type field 126, access times field 128, data block address field 130, procedure block address field 132, and size field 134. By comparison with inode 310 of FIG. 8A, it becomes apparent that fields 122–130 and 134 of inode 102 are analogous to fields 312–318 of conventional inode 310. However, according to the present invention, inode 102 of FIG. 4 further includes procedure block address field 132, which specifies the location of procedure blocks 112 within nonvolatile storage. Depending upon the file system utilized, procedure block address field 132 can include the disk address of each of procedure blocks 112, or alternatively, a pointer to only procedure block 114 with the locations of remaining procedure blocks 116 and 118 being specified utilizing linked list pointers within procedure blocks 114 and 116. In file system objects without an attached procedure, procedure block address field 132 simply remains empty or stores a null pointer.

Figure 5:
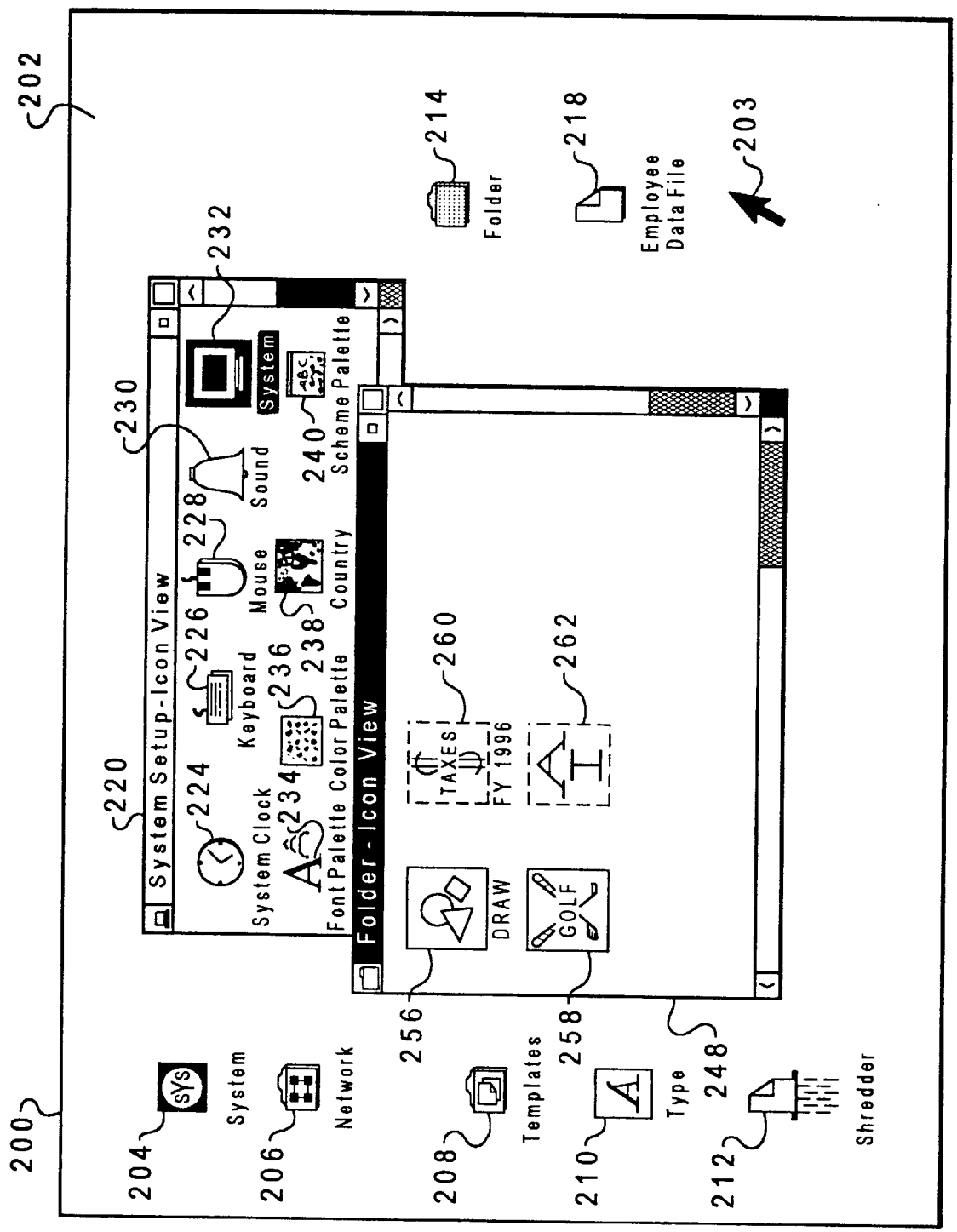
FIG. 5 illustrates a first exemplary implementation of the present invention in which a procedure attached to a folder permits only a subset of the files within the folder to be displayed to a novice user.

With reference to FIG. 5, there is illustrated a first exemplary implementation of the present invention in which a procedure is attached to a file system folder to selectively display the contents of the folder based upon the proficiency of the user. As depicted, a graphical user interface (GUI) displayed within screen 200 of display device 14 includes a desktop 202 upon which a plurality of user-selectable icons 204–218 are displayed. Each icon 204–218 represents an application, operating system function, or file storage area which a user can conveniently select utilizing graphical pointer 103 by double-clicking the left button of mouse 18. As is typical of such GUIs, when a user selects one of icons 204–218, the data, application, or action corresponding to the selecting icon is accessed or activated and the selected icon is highlighted. Many of icons 104–118 have an associated window or series of windows which are displayed in response to selection of the icon. For example, in response to selection of system icon 204, system setup window 220 is displayed to the user to provide further possible selections (i.e., icons 224–240). In the depicted example, folder 214, which contains a drawing application, a golf game, a tax-computation spreadsheet, and an artificial intelligence (AI) programming application, is also selected. Accordingly, window 248 is displayed to the user on desktop 202.

In a data processing system utilizing a conventional file system, an icon corresponding to each of the four files within folder 214 would be displayed to the user in response to the user opening folder 214. However, according to the present invention, a procedure attached to the inode of folder 214 selectively displays the contents of folder 214 within window 248 depending upon the proficiency of the user. Thus, when a user double-clicks on folder 214, the procedure attached to the inode of folder 214 is executed. In the present example, the procedure attached to the inode of folder 214 reads the data blocks of folder 214 (the files contained within folder 214), interrogates an operating system user-proficiency table that associates a user-proficiency level with each file within folder 214, and displays icons corresponding to files having a user-proficiency level at or below the current user's proficiency level. Thus, if the user logged into data processing system 10 is associated with a novice proficiency level, only draw icon 256 and golf icon 258 are displayed. However, if the user is an expert user, all of icons 256–262 are displayed to the user. Consequently, when data processing system 10 is utilized by a novice user, desktop 202 is not cluttered with application and data files that will not be accessed by the user.

Figure 6:
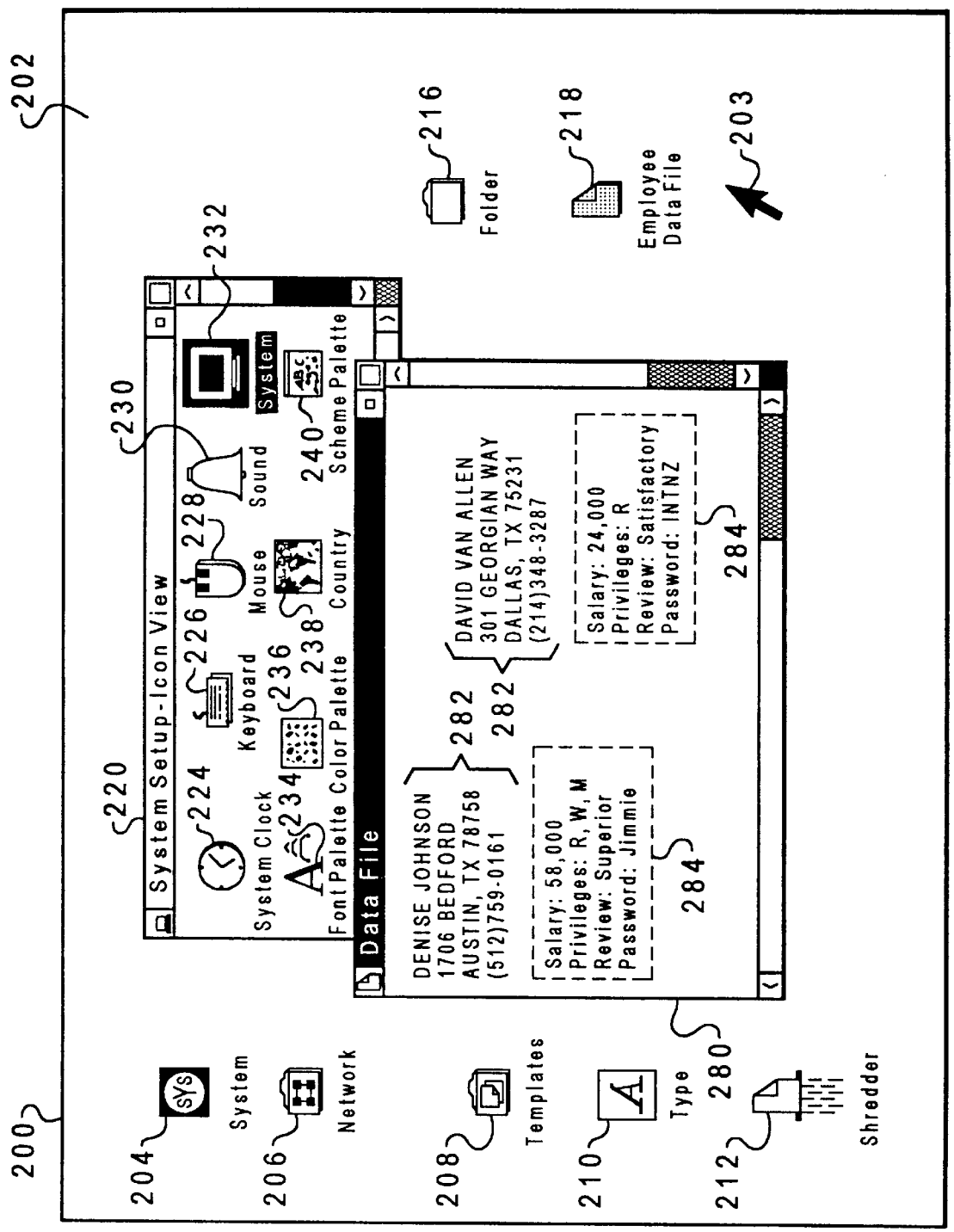
FIG. 6 depicts a second exemplary implementation of the present invention in which a procedure attached to a data file transparently filters the data file to prevent private information from being displayed to an unprivileged user.

Referring now to FIG. 6, there is depicted a second exemplary implementation of the present invention in which a procedure attached to a file is utilized to selectively display data within the file based upon the security clearance of the user. In this example, employee data file 218 has a procedure attached to its inode according to the present invention. Thus, in response to selection of employee data file icon 218 utilizing graphical pointer 203, the operating system of data processing system 10 displays data file window 280 on desktop 202. In addition, the operating system reads the inode of employee data file 218 and executes the procedure attached to the inode. In the present example, the procedure acts as a data filter that reads the data blocks attached to the inode and streams to the operating system reading process only the data allowed to be viewed by users having the present user's security clearance. For example, when employee data file 218 is opened by an ordinary user, only public data 282 is displayed within window 280. However, if a user having supervisory security clearance is logged into data processing system 10, when employee data file 218 is opened, both public data 282 and private data 284 is displayed within data file window 280. The benefits of the present invention in this case are twofold. First, the data filtering performed by the procedure attached to the inode of employee data file 218 is transparent to the user. Second, all data pertaining to the employees listed within employee data file 218 can be conveniently stored within a single location accessible to all users, while preserving the security of private data 284.

As has been described, the present invention provides an improved file system in which a selected file system objects may be customized by the attachment of a procedure to the inode of the file system object. The present invention provides enhanced file system flexibility and powerful functionality while requiring only minor modifications to conventional file system objects. Although the present invention has been described with reference to embodiments in which data filtering procedures have been attached to various file system objects, those skilled in the art will understand that the procedures which may be attached to file system objects are not limited by such embodiments. To the contrary, a user has wide latitude in constructing various types of procedures which enhance the functionality of selected file system objects.

For example, the present invention can be utilized to implement a frame-based knowledge system within a file system. A frame-based knowledge system utilizes objects (frames) to represent knowledge in a parent-child inheritance structure. Each frame contains one or more slots that describe a particular attribute of the frame. Thus, the logical structure of a frame-based knowledge system corresponds to that of a file system, with a frame corresponding to a file system directory and a slot corresponding to a file within the directory. Both frames and slots can have an attached predicate (procedure) that executes in response to a set of predetermined conditions. For example, the present invention can be utilized to create a "smart" directory that has an attached predicate, which executes when the directory is opened or becomes the current working directory.

While the invention has been particularly shown and described with reference to a preferred embodiment, it will be understood by those skilled in the art that various changes in form and detail may be made therein without departing from the spirit and scope of the invention.

What is claimed is:

1. A file system entity of a non-object oriented file system within a data processing system, said data processing system including storage media, wherein contents of said storage media are organized according to said non-object oriented file system, and wherein said data processing system executes an operating system, said file system entity comprising:
   data stored within said storage media;
   a procedure stored within said storage media;
   a node of said non-object oriented file system stored within said storage media, said node containing a plurality of attributes of said file system entity, said plurality of attributes including:
      a data location indicator which indicates one or more locations of said data within said storage media;
      a procedure location indicator which indicates one or more locations of portions of said procedure within said storage media; and
      means for automatically invoking said procedure in response to said operating system accessing said node in order to access said data, wherein file system entity customization is enhanced.

2. The file system entity of claim 1, wherein said file system entity comprises a file.

3. The file system entity of claim 1, wherein said file system entity comprises a file directory.

4. The file system entity of claim 1, wherein said file system entity comprises a logical device.

5. The file system entity of claim 1, wherein said data is organized into a plurality of data blocks.

6. The file system entity of claim 1, wherein said data comprises program instructions.

7. The file system entity of claim 1, said operating system comprising a UNIX operating system, wherein said node comprises an index node (inode).

8. The file system entity of claim 1, wherein said procedure comprises a data filter which allows said operating system to read only a portion of said data and prevents said operating system from reading a remainder of said data.

9. A method for customizing a file system entity stored within a storage media of a data processing system, wherein contents of said storage media are organized according to a non-object oriented file system, said file system entity including a node and data, wherein said node contains a plurality of attributes of said file system entity, said plurality of attributes including an indication of one or more locations of said data within said storage medium, wherein said data processing system executes an operating system, said method comprising:
   attaching a procedure to said node of said file system entity by storing within said node an indication of one or more locations within said storage media of portions of said procedure;
   in response to initiation of access to said node by said operating system in order to access said data of said file system entity, automatically executing said procedure attached to said node by referencing said indication of one or more locations of portions of said procedure; and
   providing said data of said file system entity to said operating system as permitted by said procedure.

10. The method for customizing a file system entity of claim 9, wherein said data includes a plurality of program instructions, and wherein said step of providing said data comprises providing only selected ones of said plurality of program instructions to said operating system.

11. The method of claim 9, wherein said providing step includes the step of preventing said operating system from reading a portion of said data.

12. A non-object oriented file system within a data processing system, said data processing system including a storage media organized according to said non-object oriented file system, wherein said data processing system executes an operating system, said non-object oriented file system comprising:
   a boot block stored within said storage media, said boot block containing a program utilized to load said operating system into said data processing system;
   a file system entity, including:
      (a) data stored within said storage media;
      (b) a procedure stored within said storage media;
      (c) a node stored within said storage media that contains a plurality of attributes of said file system entity, said plurality of attributes including:
         (i) a data location indicator that indicates one or more locations of said data within said storage media;
         (ii) a procedure location indicator that indicates one or more locations of portions of said procedure within said storage media; and
      means for automatically invoking execution of said procedure in response to an access of said node by said operating system in order to access said data of said file system entity, wherein file system entity customization is enhanced.

13. The non-object oriented file system of claim 12, wherein said file system entity comprises a file.

14. The non-object oriented file system of claim 12, wherein said file system entity comprises a file directory.

15. The non-object oriented file system of claim 12, wherein said file system entity comprises a logical device.

16. The non-object oriented file system of claim 12, wherein said data is organized into a plurality of data blocks.

17. The non-object oriented file system of claim 12, wherein said data comprises program instructions.

18. The non-object oriented file system of claim 12, said operating system comprising a UNIX operating system, wherein said node comprises an index node (inode).

19. The non-object oriented file system of claim 12, wherein said procedure comprises a data filter which allows said operating system to read only a portion of said data and prevents said operating system from reading a remainder of said data.

* * * * *